United States Patent
DiCintio et al.

(10) Patent No.: US 9,360,217 B2
(45) Date of Patent: Jun. 7, 2016

(54) FLOW SLEEVE FOR A COMBUSTION MODULE OF A GAS TURBINE

(71) Applicant: General Electric Company, Schenectady, NY (US)

(72) Inventors: Richard Martin DiCintio, Simpsonville, SC (US); Patrick Benedict Melton, Horse Shoe, NC (US); Lucas John Stoia, Taylors, SC (US); Christopher Paul Willis, Liberty, SC (US); Ronnie Ray Pentecost, Travelers Rest, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 600 days.

(21) Appl. No.: 13/845,485

(22) Filed: Mar. 18, 2013

(65) Prior Publication Data
US 2014/0260277 A1 Sep. 18, 2014

(51) Int. Cl.
*F02C 7/22* (2006.01)
*F23R 3/20* (2006.01)
*F23R 3/00* (2006.01)
(Continued)

(52) U.S. Cl.
CPC . *F23R 3/20* (2013.01); *F23R 3/005* (2013.01); *F23R 3/46* (2013.01); *F23R 3/60* (2013.01); *F02C 7/22* (2013.01); *F23R 3/34* (2013.01); *F23R 2900/00017* (2013.01); *F23R 2900/03043* (2013.01); *F23R 2900/03045* (2013.01)

(58) Field of Classification Search
CPC .............. F23R 3/34; F23R 3/346; F23R 3/60; F02C 7/222; F02C 7/22
USPC ........................................................ 60/739
See application file for complete search history.

(56) References Cited

U.S. PATENT DOCUMENTS

| 3,872,664 A | 3/1975 | Lohmann |
| 4,265,615 A | 5/1981 | Lohmann |

(Continued)

FOREIGN PATENT DOCUMENTS

| EP | 0526058 A1 | 3/1993 |
| EP | 0578461 A1 | 12/1994 |
| EP | 1884297 A1 | 2/2008 |

OTHER PUBLICATIONS

Co-Pending U.S. Appl. No. 13/845,439, dated Mar. 18, 2013.
(Continued)

*Primary Examiner* — William H Rodriguez
*Assistant Examiner* — Thomas Burke
(74) *Attorney, Agent, or Firm* — Dority & Manning, PA

(57) ABSTRACT

A combustion module for a combustor of a gas turbine includes an annular fuel distribution manifold disposed at an upstream end of the combustion module. The fuel distribution manifold includes an annular support sleeve having an inner surface. The combustion module further includes a fuel injection assembly having an annular combustion liner that extends downstream from the fuel distribution manifold and that terminates at an aft frame, and an annular flow sleeve that circumferentially surrounds the combustion liner. The flow sleeve extends downstream from the fuel distribution manifold and terminates at the aft frame. The flow sleeve extends continuously between the support sleeve and the aft frame. A forward portion of the flow sleeve is positioned concentrically within the support sleeve where the forward portion is slidingly engaged with the inner surface of the support sleeve.

20 Claims, 7 Drawing Sheets

(51) Int. Cl.
  *F23R 3/46* (2006.01)
  *F23R 3/60* (2006.01)
  *F23R 3/34* (2006.01)

(56) References Cited

U.S. PATENT DOCUMENTS

| | | | |
|---|---|---|---|
| 4,420,929 A | 12/1983 | Jorgensen | |
| 5,069,029 A | 12/1991 | Kuroda | |
| 5,380,154 A | 1/1995 | Norton | |
| 5,450,725 A | 9/1995 | Takahara | |
| 5,475,979 A | 12/1995 | Oag | |
| 5,802,854 A * | 9/1998 | Maeda | F23R 3/346 60/39.821 |
| 6,047,550 A | 4/2000 | Beebe | |
| 6,148,604 A | 11/2000 | Salt | |
| 6,212,870 B1 | 4/2001 | Thompson et al. | |
| 6,374,594 B1 | 4/2002 | Kraft et al. | |
| 6,442,946 B1 | 9/2002 | Kraft | |
| 6,450,762 B1 | 9/2002 | Munshi | |
| 6,543,993 B2 | 4/2003 | Burdgick et al. | |
| 6,654,710 B1 | 11/2003 | Keller | |
| 6,875,009 B2 | 4/2005 | Kayahara et al. | |
| 6,896,509 B2 | 5/2005 | Carroni et al. | |
| 6,957,949 B2 | 10/2005 | Hyde et al. | |
| 7,082,766 B1 | 8/2006 | Widener et al. | |
| 7,743,612 B2 | 6/2010 | Morenko | |
| 8,096,131 B2 | 1/2012 | Ziaei et al. | |
| 8,158,428 B1 * | 4/2012 | Krishna | G01N 25/72 250/339.14 |
| 8,171,738 B2 | 5/2012 | Fish et al. | |
| 2002/0184893 A1 | 12/2002 | Farmer | |
| 2003/0039542 A1 | 2/2003 | Cromer | |
| 2005/0044855 A1 | 3/2005 | Crawley | |
| 2005/0241317 A1 | 11/2005 | Martling | |
| 2005/0268617 A1 | 12/2005 | Amond | |
| 2008/0282667 A1 | 11/2008 | Intile | |
| 2009/0071157 A1 | 3/2009 | Cai | |
| 2009/0199561 A1 | 8/2009 | Hessler | |
| 2010/0054928 A1 | 3/2010 | Schiavo | |
| 2010/0071377 A1 | 3/2010 | Fox | |
| 2010/0139283 A1 | 6/2010 | Phillips et al. | |
| 2010/0170216 A1 * | 7/2010 | Venkataraman | F02C 7/22 60/39.37 |
| 2010/0174466 A1 | 7/2010 | Davis, Jr. et al. | |
| 2010/0263386 A1 | 10/2010 | Edwards | |
| 2011/0067402 A1 | 3/2011 | Wiebe | |
| 2011/0146284 A1 | 6/2011 | Morimoto | |
| 2011/0239653 A1 * | 10/2011 | Valeev | F23R 3/34 60/740 |
| 2011/0247314 A1 | 10/2011 | Chila | |
| 2011/0304104 A1 | 12/2011 | McMahan | |
| 2012/0186260 A1 * | 7/2012 | DiCintio | F01D 9/023 60/752 |
| 2012/0210729 A1 | 8/2012 | Cihlar et al. | |
| 2012/0304648 A1 | 12/2012 | Byrne | |
| 2014/0033728 A1 | 2/2014 | Marmilic | |
| 2014/0260272 A1 * | 9/2014 | DiCintio | F02C 7/222 60/739 |
| 2014/0260274 A1 * | 9/2014 | Stoia | F02C 7/222 60/739 |
| 2015/0159877 A1 * | 6/2015 | Stoia | F02C 7/222 60/735 |

OTHER PUBLICATIONS

Co-Pending U.S. Appl. No. 13/845,365, dated Mar. 18, 2013.
Co-Pending U.S. Appl. No. 13/845,565, dated Mar. 18, 2013.
Co-Pending U.S. Appl. No. 13/845,617, dated Mar. 18, 2013.
Co-Pending U.S. Appl. No.. 13/845,661, dated Mar. 18, 2013.
Co-Pending U.S. Appl. No. 13/845,699, dated Mar. 18, 2013.
Co-Pending U.S. Appl. No. 13/845,378, dated Mar. 18, 2013.
Co-Pending U.S. Appl. No. 13/845,384, dated Mar. 18, 2013.

* cited by examiner

FLOW SLEEVE FOR A COMBUSTION MODULE OF A GAS TURBINE

FIELD OF THE INVENTION

The present invention generally involves a combustor for a gas turbine. More specifically, the invention relates to a flow sleeve for a combustion module of the combustor.

BACKGROUND OF THE INVENTION

A combustion section of a gas turbine generally includes a plurality of combustors that are arranged in an annular array around an outer casing such as a compressor discharge casing. Pressurized air flows from a compressor to the compressor discharge casing and is routed to each combustor. Fuel from a fuel nozzle is mixed with the pressurized air in each combustor to form a combustible mixture within a primary combustion zone of the combustor. The combustible mixture is burned to produce hot combustion gases having a high pressure and high velocity.

In a typical combustor, the combustion gases are routed towards an inlet of a turbine of the gas turbine through a hot gas path that is at least partially defined by an annular combustion liner and an annular transition duct that extends downstream from the combustion liner and terminates at the inlet to the turbine. Thermal and kinetic energy are transferred from the combustion gases to the turbine to cause the turbine to rotate, thereby producing mechanical work. For example, the turbine may be coupled to a shaft that drives a generator to produce electricity.

In particular combustors, a combustion module is utilized to inject a generally lean fuel-air mixture into the hot gas path downstream from the primary combustion zone. The combustion module generally includes an annular fuel distribution manifold that circumferentially surrounds a portion of a cap assembly that partially surrounds the fuel nozzle, and a fuel injection assembly that extends between the fuel distribution manifold and the inlet to the gas turbine. The fuel injection assembly includes an annular combustion liner that extends continuously between the cap assembly and the inlet to the turbine. The continuously extending combustion liner defines the hot gas path within the combustor, thereby eliminating the separate transition duct. The combustion liner includes an annular main body that comprises of a conical section having a substantially circular cross section and a transition section that extends downstream from the conical section and that has a substantially non-circular cross section. The fuel injection assembly further includes a plurality of radially extending fuel injectors, also known as late lean fuel injectors that inject the lean fuel-air combustible mixture into the hot gas path downstream from the primary combustion zone. As a result, the combustion gas temperature is increased and the thermodynamic efficiency of the combustor is improved without producing a corresponding increase in the production of undesirable emissions such as oxides of nitrogen ($NO_x$). However, the increase in the temperature of the combustion gases results in an increase of thermal stresses on the combustion liner.

One technique for cooling the combustion liner of the combustion module includes surrounding the combustion liner with a flow sleeve assembly so as to define a cooling flow passage therebetween, and routing a portion of the compressed working fluid through the cooling passage to provide at least one of impingement, convective or conductive cooling to the combustion liner. The flow sleeve assembly generally includes an annular support sleeve that surrounds a forward end portion of the combustion liner and that is positioned concentrically within the fuel distribution manifold, an annular flow sleeve that is coupled to an aft end of the support sleeve and that surrounds the conical section of the combustion liner, and an annular impingement sleeve that is coupled to an aft end of the flow sleeve and that surrounds the transition section of the combustion liner.

While the flow sleeve assembly is generally effective for cooling the combustion liner, the multiple connections between the various components may leak or develop leaks over time due to tolerance issues and/or due to thermal and/or mechanical cycle fatigue, thereby impacting the overall cooling effectiveness and durability of the flow sleeve assembly. In addition, the loss of the compressed working fluid from the cooling passage may result in a decrease of combustor performance due to a decrease in the amount of the compressed working fluid that is routed to the fuel nozzle for combustion. Furthermore, the multiple components increase time and costs associated with assembly, disassembly and the manufacture of the combustion module. Therefore, an improved system for cooling the combustion liner of the combustion module would be useful.

BRIEF DESCRIPTION OF THE INVENTION

Aspects and advantages of the invention are set forth below in the following description, or may be obvious from the description, or may be learned through practice of the invention.

One embodiment of the present invention is a combustion module for a combustor of a gas turbine that includes an annular fuel distribution manifold disposed at an upstream end of the combustion module. The fuel distribution manifold includes an annular support sleeve having an inner surface. The combustion module further includes a fuel injection assembly having an annular combustion liner that extends downstream from the fuel distribution manifold and that terminates at an aft frame, and an annular flow sleeve that circumferentially surrounds the combustion liner. The flow sleeve extends downstream from the fuel distribution manifold and terminates at the aft frame. The flow sleeve extends continuously between the support sleeve and the aft frame. A forward portion of the flow sleeve is positioned concentrically within the support sleeve where the forward portion is slidingly engaged with the inner surface of the support sleeve.

Another embodiment of the present invention is a combustor. The combustor includes an end cover that is coupled to an outer casing that surrounds the combustor, an axially extending fuel nozzle that extends downstream from the end cover, an annular cap assembly that extends radially and axially within the combustor where the cap assembly at least partially surrounds the fuel nozzle, and a combustion module having an annular fuel distribution manifold that circumferentially surrounds at least a portion of the cap assembly. The combustion module further includes a fuel injection assembly that extends downstream from the fuel distribution manifold. The fuel injection assembly includes an annular combustion liner that extends downstream from the cap assembly and that terminates at an aft frame, and an annular flow sleeve that surrounds the combustion liner. The flow sleeve includes a forward portion that is positioned concentrically within the fuel distribution manifold, and an aft end that is coupled to the aft frame. The flow sleeve extends continuously between the forward portion of the flow sleeve and the aft frame.

The present invention may also include a gas turbine. The gas turbine generally includes a compressor, a compressor discharge casing disposed downstream from the compressor and a turbine disposed downstream from the compressor discharge casing. A combustor extends at least partially through the compressor discharge casing. The combustor includes an end cover that is coupled to the compressor discharge casing, an axially extending fuel nozzle that extends downstream from the end cover, an annular cap assembly that is disposed downstream from the end cover and that at least partially surrounds the fuel nozzle, and a combustion module that extends downstream from the cap assembly. The combustion module includes an annular fuel distribution manifold that circumferentially surrounds at least a portion of the cap assembly. The fuel distribution manifold includes a radially extending mounting flange that is coupled to the compressor discharge casing and an axially extending annular support sleeve that includes an inner surface. The combustion module further includes a fuel injection assembly that extends downstream from the fuel distribution manifold. The fuel injection assembly includes an annular combustion liner that extends downstream from the cap assembly and terminates at an aft frame. An annular flow sleeve surrounds the combustion liner and a plurality of fuel injectors extend through the flow sleeve and the combustion liner downstream from the cap assembly. The fuel injectors are fluidly connected to the fuel distribution manifold. The flow sleeve includes a forward portion that is positioned concentrically within the support sleeve between the combustion liner and the inner surface of the support sleeve and an aft end that is coupled to the aft frame. The flow sleeve extends continuously between the forward portion of the flow sleeve and the aft frame.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
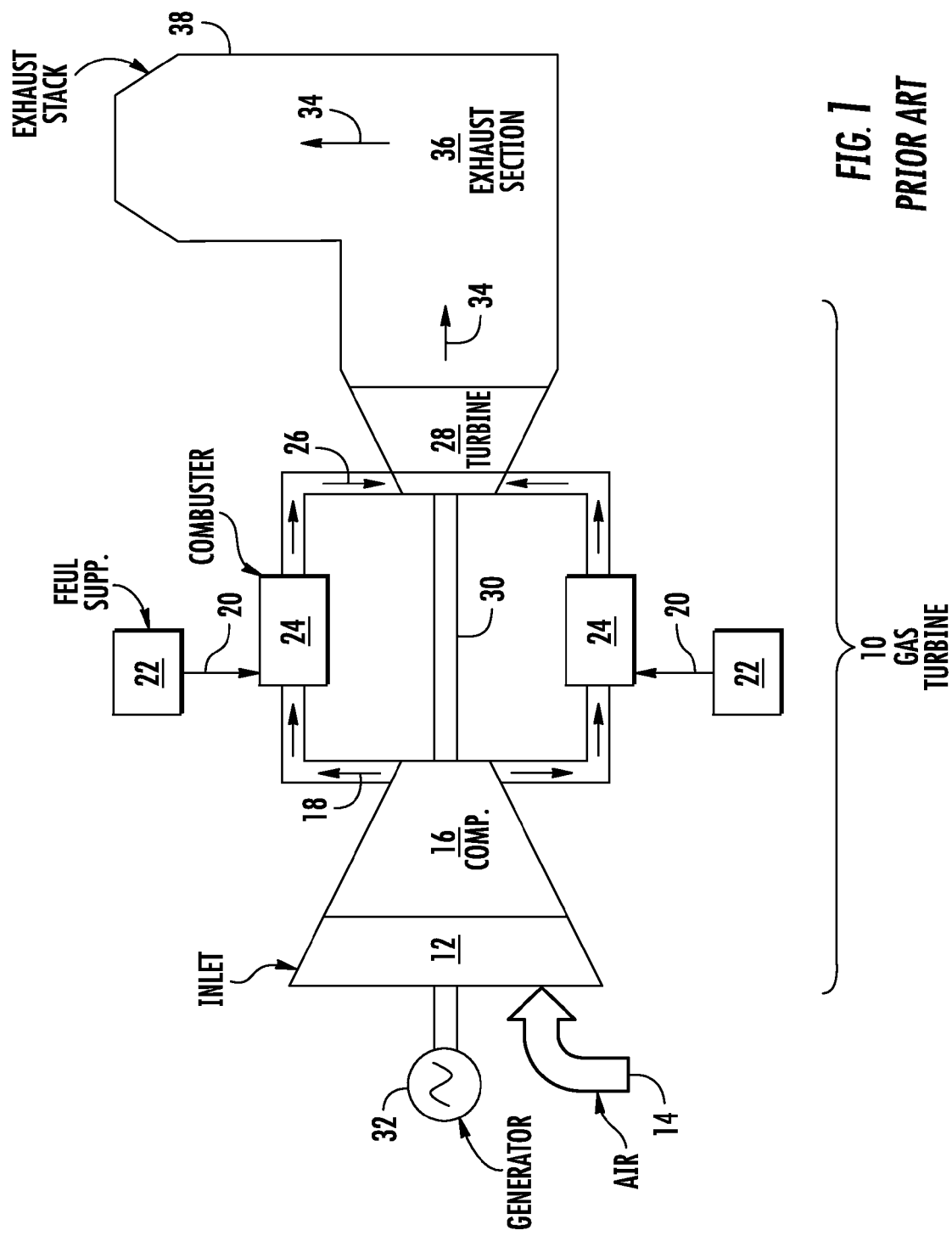
FIG. 1 is a functional block diagram of an exemplary gas turbine within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbomachine and is not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
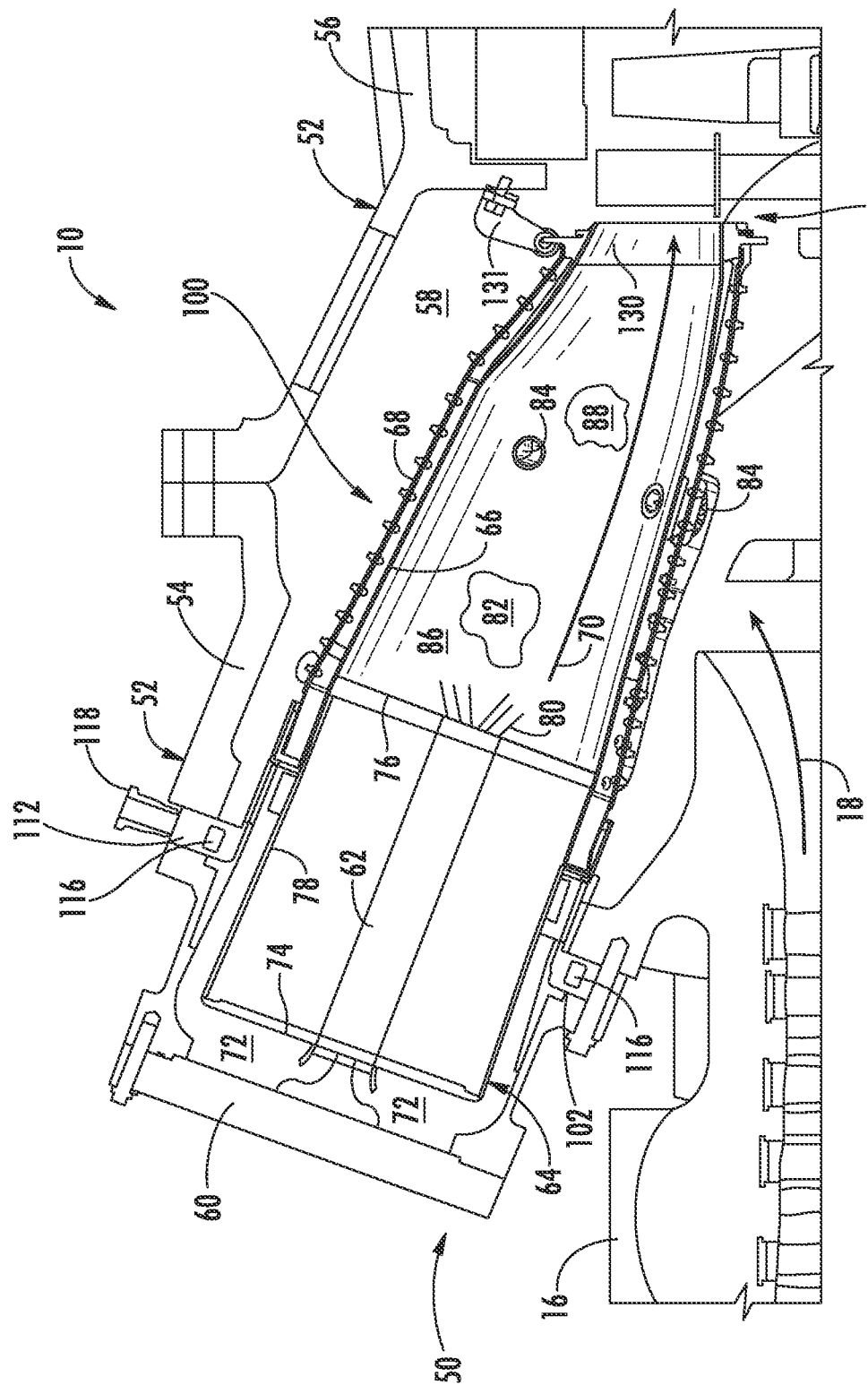
FIG. 2 is a cross sectional side view of a portion of an exemplary gas turbine, including an exemplary combustor that encompasses various embodiments of the present invention.

FIG. 2 provides a cross sectional side view of a portion of an exemplary gas turbine 10 including an exemplary combustor 50 that may encompass various embodiments of the present disclosure. As shown, the combustor 50 is at least partially surrounded by an outer casing 52 such as a compressor discharge casing 54 that is disposed downstream from the compressor and/or an outer turbine casing 56. The outer casing 52 is in fluid communication with the compressor 16 and at least partially defines a high pressure plenum 58 that surrounds at least a portion of the combustor 50. An end cover 60 is coupled to the outer casing 52 at one end of the combustor 50.

As shown in FIG. 2, the combustor 50 generally includes at least one axially extending fuel nozzle 62 that extends downstream from the end cover 60, an annular cap assembly 64 that extends radially and axially within the outer casing 52 downstream from the end cover 60, an annular hot gas path duct or combustion liner 66 that extends downstream from the cap assembly 64 and an annular flow sleeve 68 that surrounds at least a portion of the combustion liner 66. The combustion liner 66 defines a hot gas path 70 for routing the combustion gases 26 through the combustor 50. The end cover 60 and the cap assembly 64 at least partially define a head end 72 of the combustor 50.

The cap assembly 64 generally includes a forward end 74 that is position downstream from the end cover 60, an aft end 76 that is disposed downstream from the forward end 74, and one or more annular shrouds 78 that extend at least partially therebetween. In particular embodiments, the axially extending fuel nozzle(s) 62 extend at least partially through the cap assembly 64 to provide a first combustible mixture 80 that consists primarily of the fuel 20 (FIG. 1) and a portion of the compressed working fluid 18 from the compressor 16 to a primary combustion zone 82 that is defined within the combustion liner 66 downstream from the aft end 76 of the cap assembly 64.

In particular embodiments, the combustor 50 further includes one or more radially extending fuel injectors 84 also known as late-lean fuel injectors that extend through the flow sleeve 68 and the combustion liner 66 at a point that is downstream from the at least one axially extending fuel nozzle 62. The combustion liner 66 defines a combustion chamber 86 within the combustor 50. In particular embodiments, the combustion liner 66 further defines a secondary combustion zone 88 that is proximate to the fuel injector(s) 84 and downstream from the primary combustion zone 82. In particular embodiments, the combustion liner 66, the flow sleeve 68 and the fuel injector(s) 84 are provided as part of a combustion module 100 that extends through the outer casing 52 and that circumferentially surrounds at least a portion of the cap assembly 64.

Figure 3:
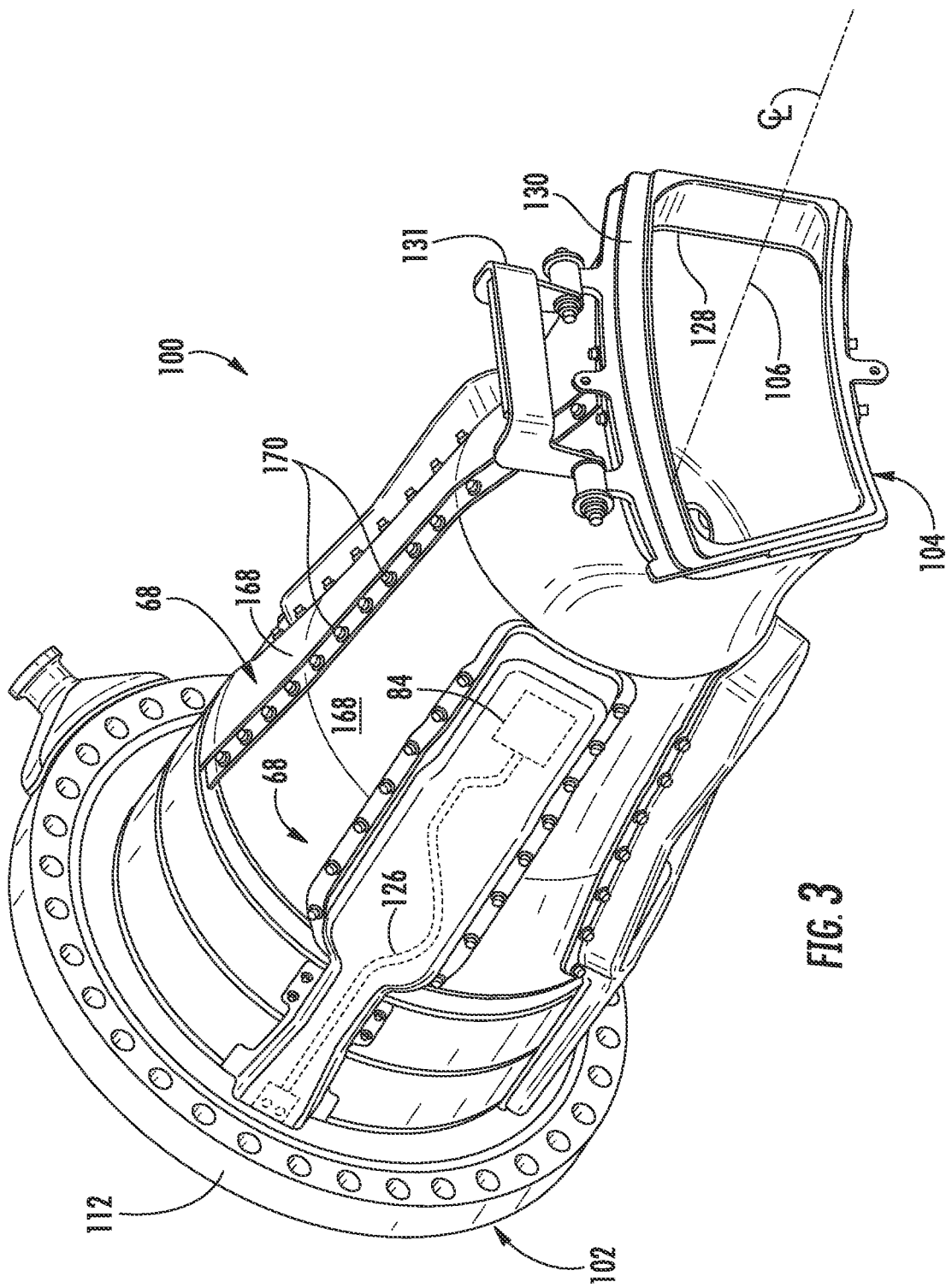
FIG. 3 is a perspective view of a combustion module as shown in FIG. 2, that may encompass various embodiments of the present invention.
Figure 4:
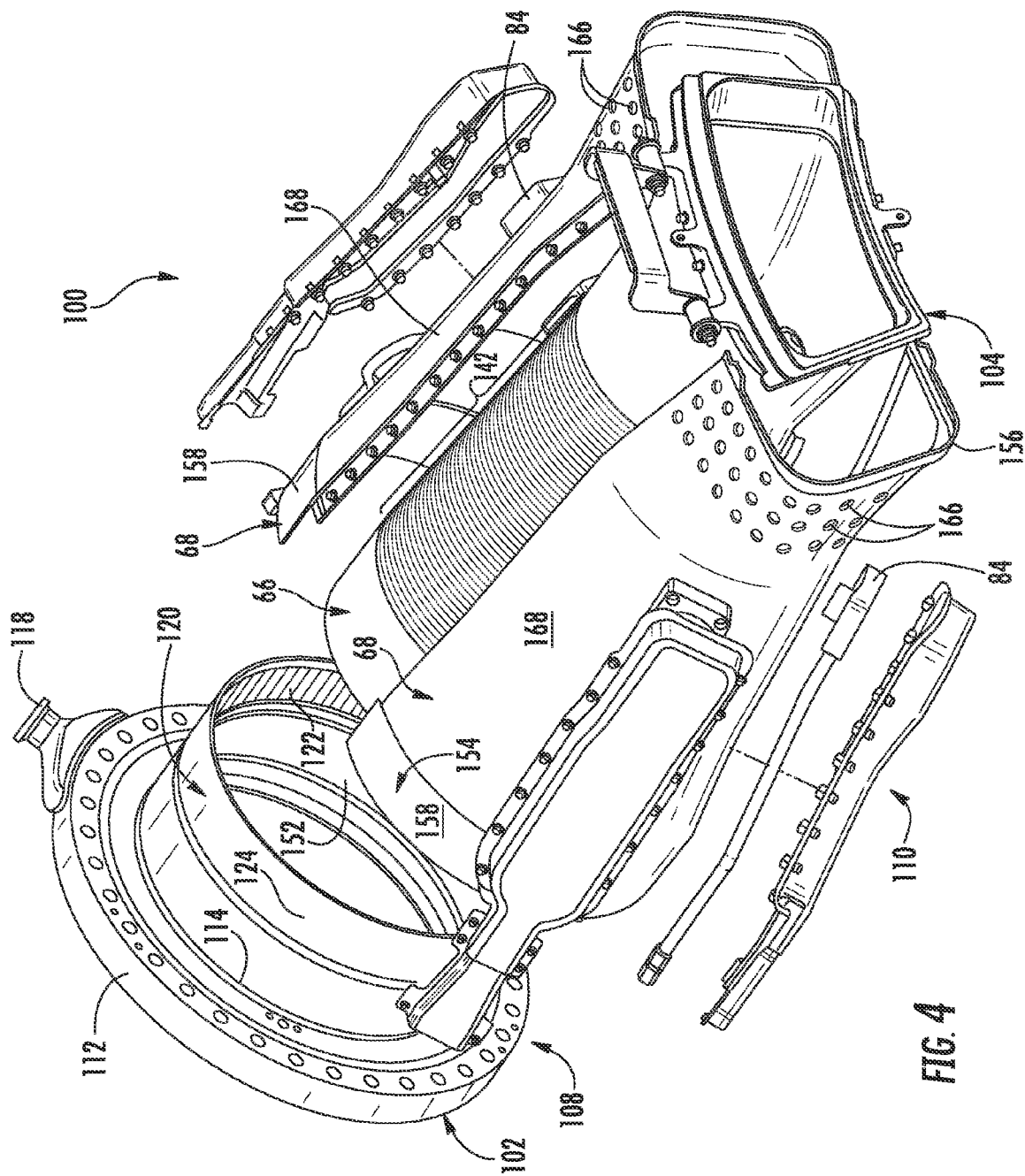
FIG. 4 is an exploded perspective view of the combustion module as shown in FIG. 3, according to one embodiment of the present invention.

FIG. 3 provides a perspective view of the combustion module 100 as shown in FIG. 2, and FIG. 4 provides an exploded perspective view of the combustion module 100 as shown in FIG. 3. As shown in FIG. 3, the combustion module 100 is generally provided as an assembled or singular component. The combustion module 100 includes a forward or upstream end 102 that is axially separated from an aft or downstream end 104 with respect to an axial centerline 106 of the combustion module 100.

In particular embodiments, as shown in FIG. 4, the combustion module 100 includes an annular fuel distribution manifold 108 disposed at the upstream end 102 of the combustion module 100 and a fuel injection assembly 110 that extends downstream from the fuel distribution manifold 108 and that terminates at the downstream end 104 of the combustion module 100. The fuel distribution manifold 108 includes a radially extending mounting flange 112 that extends circumferentially around a forward end 114 of the fuel distribution manifold 108. As shown in FIG. 2, the mounting flange 112 at least partially defines a fuel plenum 116. As shown in FIGS. 2 and 4, a fuel inlet port 118 extends outward from the mounting flange 112. The fuel inlet port 118 provides for fluid communication between the fuel supply 22 (FIG. 1) and the fuel plenum 116 (FIG. 2). As shown in FIG. 4, the fuel distribution manifold 108 further includes an annular support sleeve 120 having an inner side 122 that is radially separated from an outer side 124. The annular support sleeve 120 extends generally axially downstream from the mounting flange 112.

In particular embodiments, as shown in FIG. 4, the combustion liner 66, the flow sleeve 68 and the fuel injector(s) 84 are included as part of the fuel injection assembly 110. As shown in FIG. 3, each fuel injector 84 may be fluidly coupled to the fuel distribution manifold 108 through a fluid conduit 126 that extends between the fuel injector 84 and the mounting flange 112.

Figure 5:
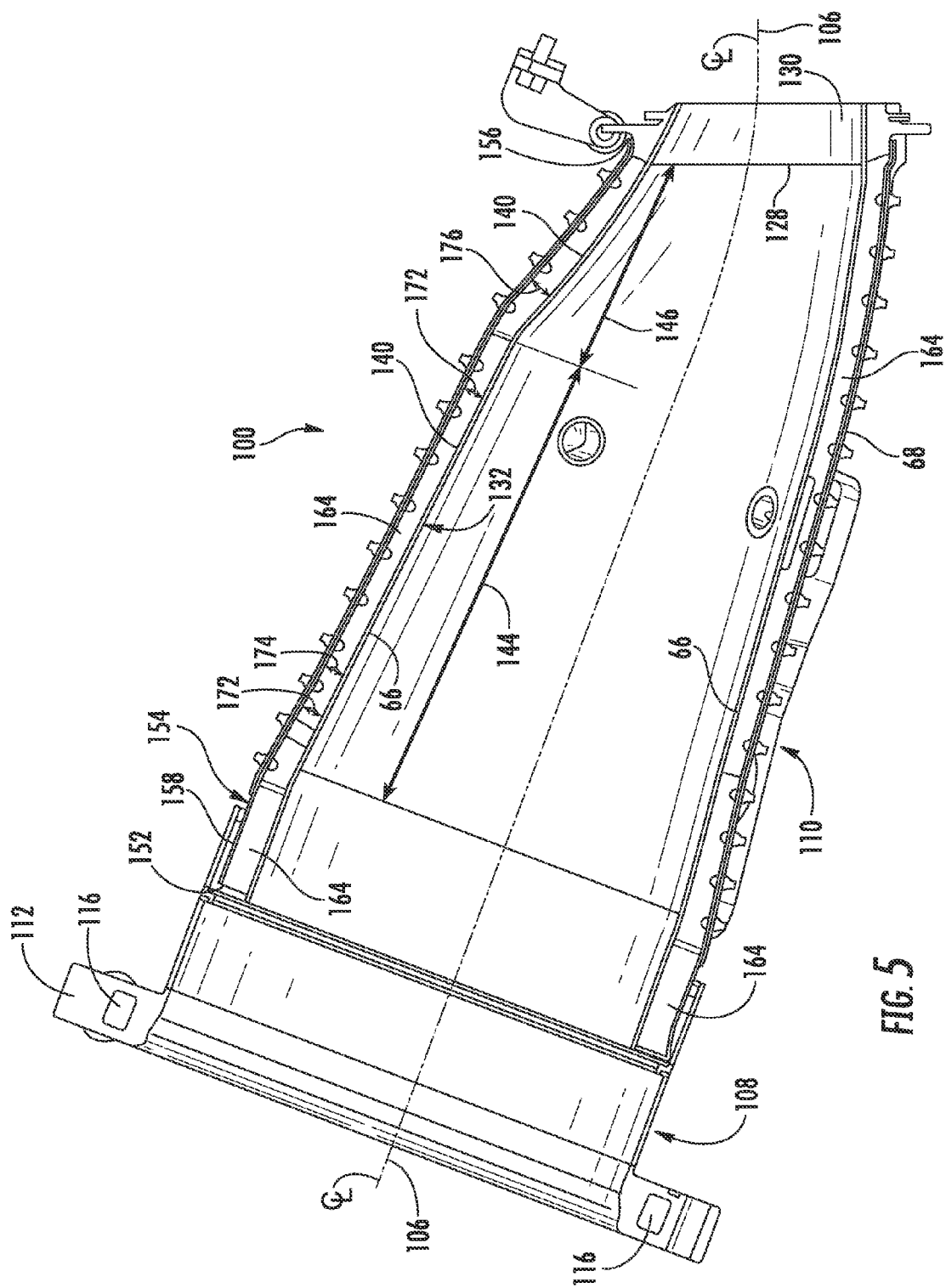
FIG. 5 is a cross sectional side view of the combustion module as show in FIG. 3, according to one embodiment of the present invention.

FIG. 5 provides a cross sectional side view of the combustion module 100 as shown in FIGS. 2, 3 and 4, and FIG. 6 provides a side view of the combustion liner 66 of the combustion module 100. As shown in FIG. 5, the combustion liner 66 extends downstream from the fuel distribution manifold 108 and an aft or downstream end 128 of the combustion liner 66 terminates at an aft frame 130 or other support structure that circumferentially surrounds the aft end 128 as shown in FIG. 3. As shown in FIG. 3, a mounting bracket 131 may be coupled to the aft frame 130. In one embodiment, as shown in FIG. 2, the aft frame 130 and/or the mounting bracket 131 is coupled to the outer turbine casing 56 and the mounting flange 112 of the fuel distribution manifold 108 is connected to the compressor discharge casing 54 so as to constrain the combustion module 100 at both the forward and aft ends 102, 104 of the combustion module 100.

Figure 6:
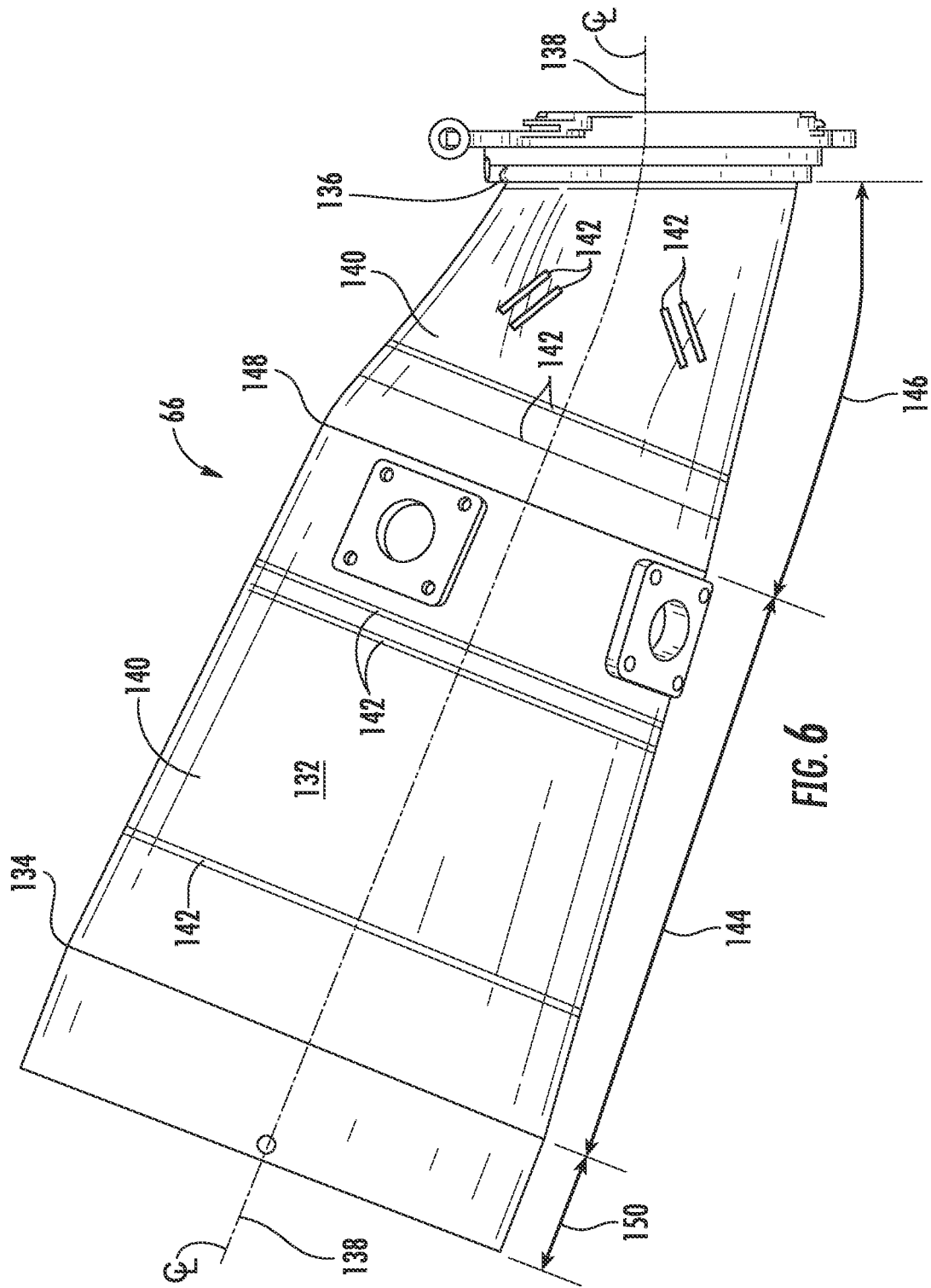
FIG. 6 is a side view of a combustion liner of the combustion module as shown in FIG. 3, according to at least one embodiment of the present invention.

As shown in FIG. 6, the combustion liner 66 comprises an annular main body 132. The main body 132 generally includes a forward end 134 axially separated from an aft end 136 with respect to an axial centerline 138 of the combustion liner 66. The main body 132 extends continuously from the forward end 134 to the aft end 136. The main body 132 includes an outer or cold side 140 that extends between the forward end 134 and the aft end 136. In particular embodiments, as shown in FIGS. 3 and 6, a plurality of cooling features 142 such as raised ribs or turbulators extend radially outward from the outer surface 140 of the main body 132.

In particular embodiments, as shown in FIG. 6, the main body 132 comprises a conical section 144 and a transition section 146, thereby eliminating the need for a separate transition duct. A transitional intersection 148 is defined between the forward end 134 and the aft end 136 of the main body 132 at a point where the conical section 144 and the transition section 146 intersect. For example, where the main body 132 begins to change from a generally circular cross section to a non-circular cross section. In particular embodiments, an annular flange 150 is disposed at the forward end 132 of the main body 132. The flange 150 at least partially surrounds a portion of the cap assembly 64 (FIG. 2). In particular embodiments, as shown in FIG. 6, the cooling features 142 may be disposed on the conical section 144 and/or the transition section 146 of the main body 132.

As shown in FIGS. 4 and 5, the flow sleeve 68 includes a forward end 152 and an outer forward portion 154 disposed proximate to the forward end 152 and an aft end 156 that is axially separated from the forward end 152 with respect to the axial centerline 106 (FIG. 5) of the combustion module 100. The forward portion 154 of the flow sleeve 68 may at least partially define an outer engagement surface 158. In particular embodiments, as shown in FIG. 5, the flow sleeve 68 extends continuously between the fuel distribution manifold 108 and the aft frame 130. In particular embodiments, as shown in FIG. 5, the forward portion 154 of the flow sleeve 68 is positioned generally concentrically within the support sleeve 120 of the fuel distribution manifold 108.

Figure 7:
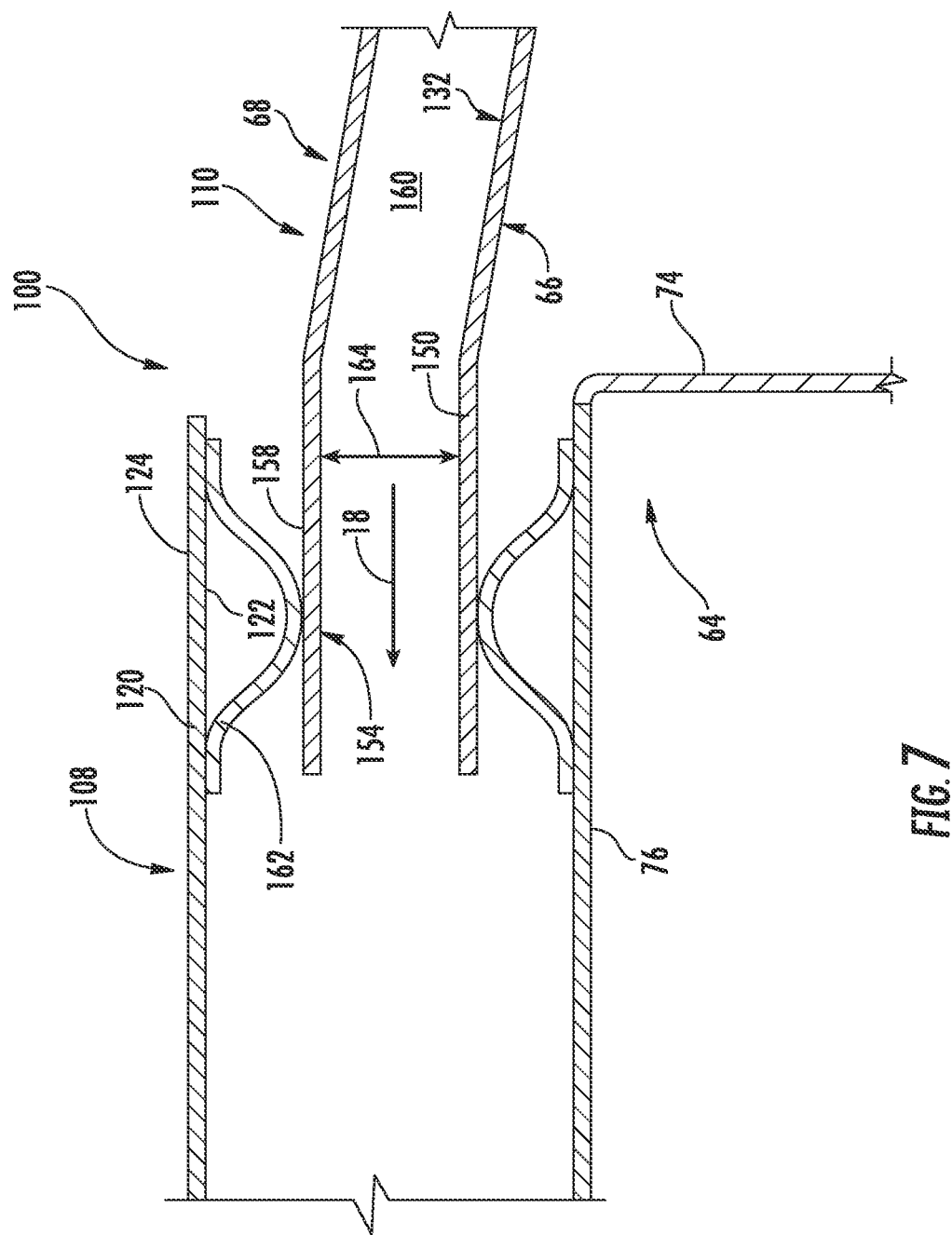
FIG. 7 is an enlarged cross sectional view of a portion of the combustor including a portion of the combustion module as shown in FIG. 2.

FIG. 7 provides an enlarged view of a portion of the combustor 50 including a portion of the cap assembly 64 and a portion of the combustion module 100 as shown in FIG. 2. In particular embodiments, as shown in FIG. 7, the outer engagement surface 158 of the forward portion 154 of the flow sleeve 68 is slidingly engaged with the inner surface 122 of the support sleeve 120. In this manner, the flow sleeve 68 is allowed to slide or translate along the inner side 122 of the support sleeve 120 of the fuel distribution manifold 108 during operation of the combustor 24. As further shown in FIG. 7, the flange 150 of the main body 132 of the combustion liner 66 at least partially surrounds a portion of the cap assembly 64.

In particular embodiments, as shown in FIG. 7, a compression or spring seal 162 such as a hula seal extends radially between the outer engagement surface 158 of the forward portion 154 of the flow sleeve 68 and the inner side 122 of the support sleeve 120. In particular embodiments, the spring seal 162 may be connected to the support sleeve 120. In the alternative, the spring seal 162 may be connected to the flow sleeve 68. The spring seal 162 at least partially provides structural support for the flow sleeve 68 during installation and/or operation of the gas turbine 10 while allowing for axial movement between the fuel distribution manifold 108 and the fuel injection assembly 110 during various operational modes of the gas turbine 10 such as during startup, shutdown and/or turndown operations.

In particular embodiments, as shown in FIG. 5, the flow sleeve 68 is radially separated from the combustion liner 66 so as to define an annular cooling flow passage 164 therebetween. The cooling flow passage 164 generally extends continuously along the length of the combustion liner 66. For example, the cooling flow passage 164 extends continuously between the aft frame 130 and the forward portion 154 and/or the forward end 152 of the flow sleeve 68.

In particular embodiments, as shown in FIG. 4, the flow sleeve 68 may comprise a plurality of cooling or impingement holes 166 that provide for fluid communication through the flow sleeve 68 into the cooling flow passage 164 (FIG. 5) during operation of the gas turbine 10. In at least one embodiment, as shown in FIGS. 3 and 4, the flow sleeve 68 includes two semi-annular flow sleeve sections 168 that wrap at least partially around the combustion liner 66 (FIG. 5). As shown in FIG. 3, the two semi-annular flow sleeve sections 168 are joined together using a plurality of fasteners 170 such as bolts or other locking fasteners which are suitable for the operating environment of the combustion module 100. In the alternative, the semi-annular flow sleeve sections 168 may be welded or joined together by any mechanical means suitable for the operating environment within the combustor 50.

In one embodiment, as shown in FIG. 5, the flow sleeve 68 is radially separated from the combustion liner 66 at a radial distance 172 that is generally constant between the aft frame and the forward end 152 of the main body 132 of the combustion liner 66. In another embodiment, the radial distance 172 between the combustion liner 66 and the flow sleeve 68 varies along/across the cold side 140 of the main body 132 of the combustion liner 66. For example, the radial distance 172 may increase and/or decrease across the conical section 144 and/or the transition section 146 of the combustion liner 66 to control a flow rate and/or velocity of the compressed working fluid 18 (FIG. 2) at a particular location on the main body 132 as it flows through the cooling flow passage 164, thereby allowing for enhanced localized control over the cooling effectiveness of the compressed working fluid 18 in particular areas of the cooling flow passage 164.

In particular embodiments, the flow sleeve 68 is separated from the combustion liner 64 at a first radial distance 174 with respect to the conical section 144 and a second radial distance 176 with respect to the transition section 146. In particular embodiments, the first radial distance 174 is greater than the second radial distance 176 along at least a portion of the conical section 144 of the combustion liner 66, thereby providing for effective impingement cooling at the transition section 146 of the main body 132 of the combustion liner 66 while reducing a pressure drop of the compressed working fluid as it flows from the high pressure plenum 58, through the cooling holes 166, into the cooling flow passage 164 and onto the cold side 140 of the main body 132. In the alternative, the second radial distance 176 may be greater than the first radial distance 168 along at least a portion of the transition section 146 of the combustion liner 66 to control a flow velocity of the compressed working fluid 18 through the cooling flow passage 164 across the conical section 144 of the main body 132 of the combustion liner 66.

In operation, as described above and as illustrated in the various figures, a portion of the compressed working fluid 18 from the compressor 16 is routed into the cooling flow passage 164 through the plurality of cooling or impingement holes 166. The compressed working fluid 18 is focused onto the outer or cold side 140 of the combustion liner 66 at the transition section 146 to provide impingement or jet cooling to the transition section 146 of the main body 132 of the combustion liner 66. The radial distance 172 between the flow sleeve 68 and the conical section 144 and/or the transition section 146 of the combustion liner 66 is set as a constant distance and/or a varying radial distance to control the flow volume and/or velocities of the compressed working fluid 18 through the cooling flow passage 164, thereby effectively cooling the combustion liner, particularly at hot spots formed by increased combustion temperatures caused by late-lean fuel injection.

The compressed working fluid 18 provides at least one of impingement, convective or conductive cooling to the combustion liner 66 as it is routed through the cooling flow passage 164 and on towards the head end 58 of the combustor 50. The continuously extending flow sleeve 68 eliminates any of the connection joints of previous flow sleeve assemblies. As a result, leakage from the cooling flow passage is eliminated, thereby improving the overall efficiency of the combustor 50. In addition, by eliminating the multiple components of existing flow sleeve assemblies, the time and costs associated with assembly, disassembly and manufacture of the combustion module 100 are decreased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combustion module for a combustor of a gas turbine, comprising:
   a. an annular fuel distribution manifold disposed at an upstream end of the combustion module, the fuel distribution manifold including an annular support sleeve having an inner surface;
   b. a fuel injection assembly having an annular combustion liner that extends downstream from the fuel distribution manifold and that terminates at an aft frame, and an annular flow sleeve that circumferentially surrounds the combustion liner, the flow sleeve extending downstream from the fuel distribution manifold and terminating at the aft frame, the flow sleeve extending continuously between the support sleeve and the aft frame; and
   c. wherein a forward portion of the flow sleeve is positioned concentrically within the support sleeve such that the fuel distribution manifold forms an annulus around the forward portion of the flow sleeve, the forward portion being slidingly engaged with the inner surface of the support sleeve.

2. The combustion module as in claim 1, further comprising a continuous cooling flow passage defined between the combustion liner and the flow sleeve that extends between the aft frame and the forward portion of the flow sleeve.

3. The combustion module as in claim 1, wherein the combustion liner comprises a conical section and a transition section, the flow sleeve being radially separated from the combustion liner at a first radial distance with respect to the conical section and a second radial distance with respect to the transition section.

4. The combustion module as in claim 1, wherein the flow sleeve is radially separated from the combustion liner at a radial distance that varies along the length of the combustion liner.

5. The combustion module as in claim 1, wherein the flow sleeve at least partially defines a plurality of impingement cooling passages.

6. The combustion module as in claim 1, wherein the fuel injection assembly further comprises a plurality of fuel injectors that extend through the flow sleeve and the combustion liner so as to provide for fluid communication into the combustion liner, each of the fuel injectors being fluidly connected to the fuel distribution manifold.

7. The combustion module as in claim 1, wherein the flow sleeve comprises of two or more semi-annular flow sleeve sections joined together to surround the combustion liner.

8. The combustion module as in claim 1, further comprising a compression seal that extends radially between the forward portion of the flow sleeve and the inner surface of the support sleeve.

9. A combustor comprising:
   a. an end cover coupled to an outer casing that surrounds the combustor;
   b. an axially extending fuel nozzle that extends downstream from the end cover;
   c. an annular cap assembly that extends radially and axially within the combustor, the cap assembly at least partially surrounding the fuel nozzle; and
   d. a combustion module having an annular fuel distribution manifold that circumferentially surrounds at least a portion of the cap assembly and a fuel injection assembly that extends downstream from the fuel distribution manifold, wherein the annular fuel distribution manifold is mounted between the end cover and the outer casing, the fuel injection assembly comprising:
      i. an annular combustion liner that extends downstream from the cap assembly and that terminates at an aft frame; and
      ii. an annular flow sleeve that surrounds the combustion liner, the flow sleeve having a forward portion positioned concentrically within the fuel distribution manifold and an aft end coupled to the aft frame, wherein the fuel distribution manifold forms an annulus around the forward portion of the flow sleeve, and wherein the flow sleeve extends continuously between the forward portion and the aft frame.

10. The combustor as in claim 9, further comprising a continuous cooling flow passage defined between the combustion liner and the flow sleeve that extends between the aft frame and the forward portion of the flow sleeve.

11. The combustor as in claim 9, wherein the combustion liner comprises a conical section and a transition section, the flow sleeve being radially separated from the combustion liner at a first radial distance with respect to the conical section and a second radial distance with respect to the transition section.

12. The combustor as in claim 9, wherein the flow sleeve is radially separated from the combustion liner at a radial distance that varies along the length of the combustion liner.

13. The combustor as in claim 9, wherein the flow sleeve at least partially defines a plurality of impingement cooling passages.

14. The combustor as in claim 9, wherein the fuel injection assembly further comprises a plurality of fuel injectors that extend through the flow sleeve and the combustion liner so as to provide for fluid communication into the combustion liner downstream from the fuel nozzle, each of the fuel injectors being fluidly connected to the fuel distribution manifold.

15. The combustor as in claim 9, wherein the flow sleeve comprises of two or more semi-annular flow sleeve sections joined together to surround the combustion liner.

16. The combustor as in claim 9, further comprising a compression seal that extends radially between the forward portion of the flow sleeve and the fuel distribution manifold.

17. A gas turbine, comprising:
   a. a compressor, a compressor discharge casing disposed downstream from the compressor and a turbine disposed downstream from the compressor discharge casing; and
   b. a combustor that extends at least partially through the compressor discharge casing, the combustor having an end cover coupled to the compressor discharge casing, an axially extending fuel nozzle that extends downstream from the end cover, an annular cap assembly disposed downstream from the end cover and that at least partially surrounds the fuel nozzle, and a combustion module that extends downstream from the cap assembly, the combustion module comprising:
      i. an annular fuel distribution manifold that circumferentially surrounds at least a portion of the cap assembly, the fuel distribution manifold having a radially extending mounting flange that is coupled to the compressor discharge casing and an axially extending annular support sleeve, the support sleeve having an inner surface, wherein the end cover is axially spaced from the compressor discharge casing via the radially extending mounting flange;
      ii. a fuel injection assembly that extends downstream from the fuel distribution manifold, the fuel injection assembly having an annular combustion liner that extends downstream from the cap assembly and terminates at an aft frame, an annular flow sleeve that surrounds the combustion liner, and a plurality of fuel injectors that extend through the flow sleeve and the combustion liner downstream from the cap assembly, the fuel injectors being fluidly connected to the fuel distribution manifold; and iii. wherein the flow sleeve includes a forward portion positioned concentrically within the support sleeve between the combustion liner and the inner surface of the support sleeve and an aft end that is coupled to the aft frame, the flow sleeve extending continuously between the forward portion of the flow sleeve and the aft frame.

18. The gas turbine as in claim 17, further comprising a cooling flow passage defined between the combustion liner and the flow sleeve that extends continuously between the aft frame and the forward portion of the flow sleeve.

19. The gas turbine as in claim 17, wherein the combustion liner comprises a conical section and a transition section, the flow sleeve being radially separated from the combustion liner at a first radial distance with respect to the conical section and a second radial distance with respect to the transition section.

20. The gas turbine as in claim 17, wherein the flow sleeve is radially separated from the combustion liner at a radial distance that varies along the length of the combustion liner.

* * * * *